UNITED STATES PATENT OFFICE.

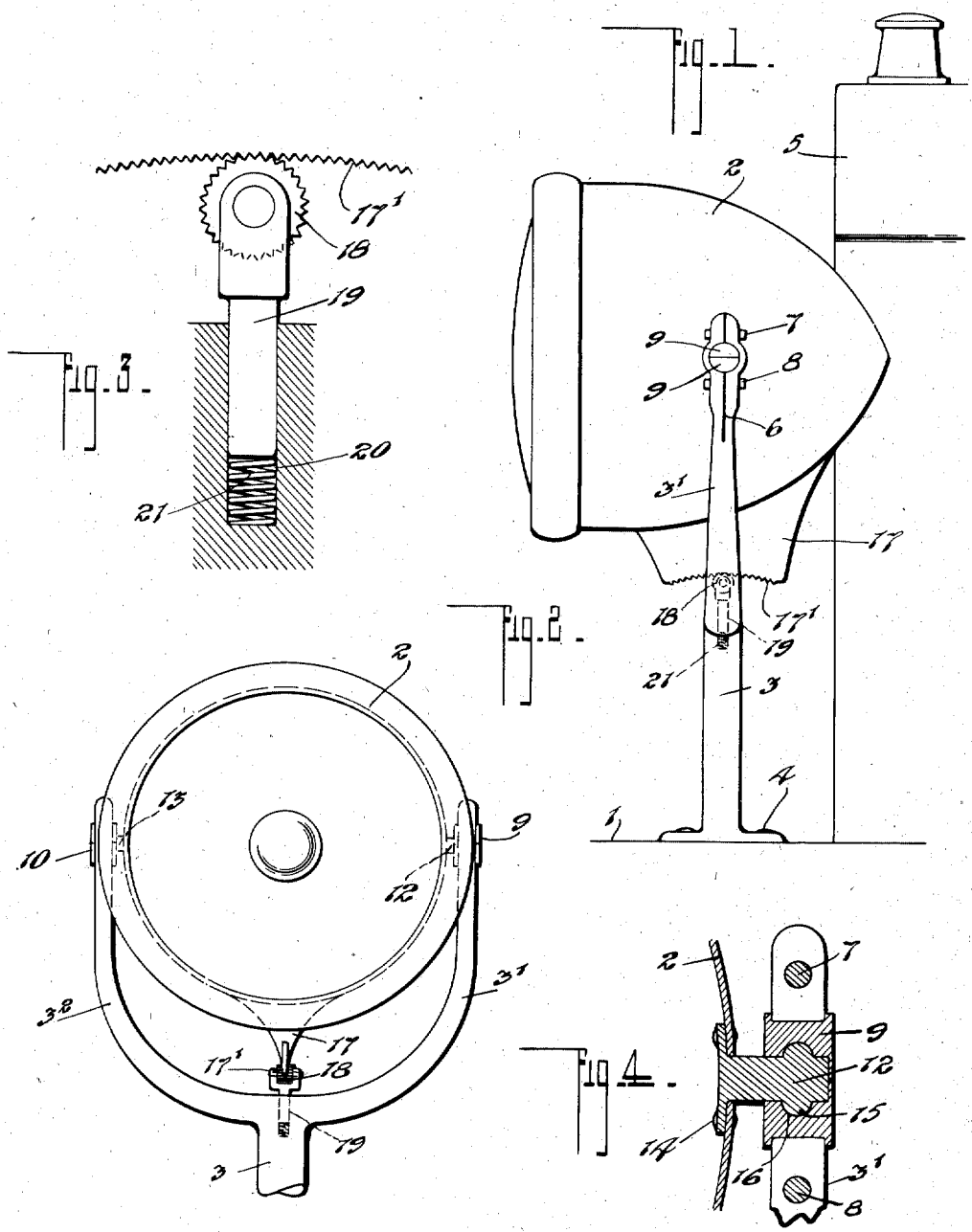

GILBERT ROBERT MATHESON AND JOSEPH BERTRAM SHAW, OF WINNIPEG, MANITOBA, CANADA.

ATTACHMENT TO AUTOMOBILE-HEADLIGHTS.

1,217,199.  Specification of Letters Patent.  Patented Feb. 27, 1917.

Application filed April 27, 1915. Serial No. 24,303.

*To all whom it may concern:*

Be it known that we, GILBERT ROBERT MATHESON and JOSEPH BERTRAM SHAW, both of the city of Winnipeg, in the Province of Manitoba, Canada, have invented certain new and useful Improvements in Attachments to Automobile-Headlights, of which the following is the specification.

The invention relates to an improvement in attachments to automobile headlights and the object of the invention is to provide a self leveling headlight which will remain in the horizontal position irrespective of the inclination of the car body and in so doing retain the light rays on the roadway. A further object of the invention is to provide in combination with this improved self setting headlight means for retarding the swinging of the headlight so that it will not oscillate unduly or extremely under natural road conditions.

With the above objects in view the invention consists essentially in a headlight fitted to swing on a horizontal axis, a weight for retaining the headlight under the action of gravity normally in a horizontal position and means for retarding the swing of the headlight around its horizontal axis, the parts being arranged and constructed as hereinafter more particularly described and later pointed out in the appended claims.

Figure 1 represents a side view of our attachment attached to a headlight.

Fig. 2 represents a front view of the headlight and the attachment.

Fig. 3 represents an enlarged detailed side view of the pinion pin and pinion, a portion of the lamp bracket being shown in vertical section.

Fig. 4 represents an enlarged detailed vertical sectional view through the lamp bracket.

In the drawing like characters of reference indicate corresponding parts in each figure.

1 represents the chassis of an automobile and 2 an automobile headlight, the headlight being supported from the chassis by a bracket 3 permanently fastened at 4 to the chassis.

The ordinary automobile radiator is shown at 5.

In the drawing we have simply shown one headlight but it will be understood that there are two as customary and that they occupy their usual positions at opposite sides of the radiator.

The bracket 3 is supplied with upstanding forked arms 3' and 3² having their upper extremities split as indicated at 6 and supplied with fastening bolts 7 and 8.

The split extremities of the arms form bearings for similar split two piece bearing blocks or journals 9 and 10, the journals being horizontally alined and receiving pivotally, in each instance, stub axles 12 and 13 having their inner ends permanently secured to the headlight sides as shown at 14. The spindles are formed each with a circumferentially directed rib 15 which is received within a complementary groove 16 provided in the journal in each instance. The spindles are arranged so that the light is free to swing in the vertical plane but on a horizontal axis.

In order to balance the headlight we suspend a weight 17 from the under side thereof, the weight in the present instance having the appearance of a more or less wedge shaped tongue fitted at the lower edge, that is, the under side, with teeth to form a rack 17'. The rack is slightly concaved to bring the central portion thereof nearer the horizontal axis on which the headlight is pivoted. The reason for this will be later explained.

18 is a pinion engaging with the rack and pivotally mounted in the upper end of a forked pinion pin 19 having the lower end thereof extending within a vertically disposed receiving opening 20 formed in the head of the bracket 3.

A spiral spring 21 is inserted in the opening prior to putting the pinion pin in place and the spring serves to hold the pinion continuously in engagement with the rack.

Under normal conditions, that is, when the automobile is riding on a level road, the headlight assumes and retains the horizontal position or as shown in the drawing. It is held in this position by the weight and is prevented from oscillating under ordinary driving conditions by the pinion engaging with the rack and the pressure of the spring working on the pinion.

When the roadway inclines the weight retains the light in the horizontal position irrespective of the inclination of the automobile body. Accordingly the light rays are directed on the roadway at all times to best advantage for driving purposes.

We wish here to point out that the swinging of the headlight to the extreme positions is retarded owing to the concaved construction of the rack. In other words the action of the spring becomes stronger the greater the tilt of the light, as the said spring is compressed by the down push of the pin as caused by the long ends, so to speak, of the rack.

We do not wish to be restricted to the special manner in which the headlight is supported nor to the special device shown for retarding the swing, as it is obvious these are purely mechanical arrangements for which other constructions could be readily substituted without departing in the least from the spirit of the invention.

What we claim as our invention is:—

1. The combination with the headlight bracket of an automobile, of a headlight pivotally mounted in the bracket on a horizontal axis, a balancing weight attached to the headlight and means for retarding the swing of the headlight around the horizontal axis, as and for the purpose specified.

2. In an automobile the combination with a headlight bracket permanently secured to the automobile body, of a headlight pivotally mounted on a horizontal axis in the bracket, a balancing weight secured to the under side of the headlight and retarding means carried by the bracket and engaging with the weight, as and for the purpose specified.

3. In an automobile the combination with a headlight bracket permanently secured to the automobile body, of a headlight, horizontally disposed alined stub axles secured to the opposite sides of the headlight and pivotally mounted in the bracket, a balancing weight attached to the under side of the headlight and provided on the under side with rack teeth and a pinion carried by the bracket and engaging with the teeth of the rack, as and for the purpose specified.

4. In an automobile the combination with a headlight bracket permanently secured to the automobile body, of a headlight, horizontally disposed alined stub axles secured to the opposite sides of the headlight and pivotally mounted in the bracket, a balancing weight attached to the under side of the headlight and provided on the under side with a concave rack and a spring pressed pinion carried by the bracket and engaging continuously with the teeth of the rack, as and for the purpose specified.

Signed at Winnipeg this 29th day of January, 1915.

GILBERT ROBERT MATHESON.
JOSEPH BERTRAM SHAW.

In the presence of—
GERALD S. ROXBURGH,
ROLAND FOSTER.